Nov. 14, 1933.  J. S. REYNOLDS  1,934,769
INTERNAL EXPANDING BRAKE
Filed Oct. 27, 1928   4 Sheets-Sheet 1

INVENTOR.
JOY S. REYNOLDS
BY
ATTORNEY.

Nov. 14, 1933.    J. S. REYNOLDS    1,934,769
INTERNAL EXPANDING BRAKE
Filed Oct. 27, 1928    4 Sheets-Sheet 2

INVENTOR.
JOY S. REYNOLDS
BY
ATTORNEY.

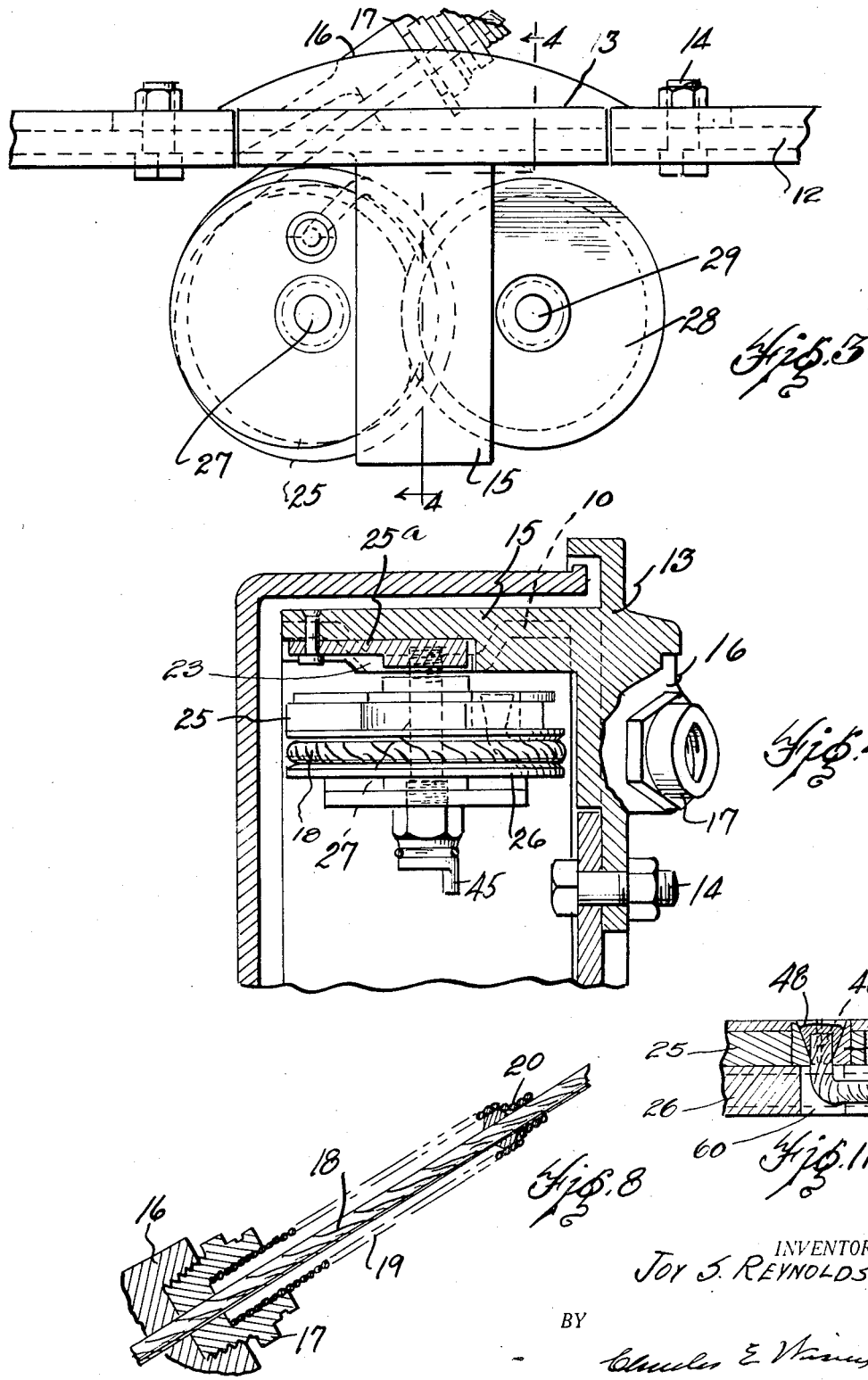

Nov. 14, 1933.  J. S. REYNOLDS  1,934,769
INTERNAL EXPANDING BRAKE
Filed Oct. 27, 1928  4 Sheets-Sheet 4

INVENTOR.
JOY S. REYNOLDS
BY
ATTORNEY.

Patented Nov. 14, 1933

1,934,769

UNITED STATES PATENT OFFICE 1,934,769

INTERNAL EXPANDING BRAKE

Joy S. Reynolds, Detroit, Mich.

Application October 27, 1928. Serial No. 315,396

14 Claims. (Cl. 188—78)

This invention relates to expanding mechanism for internal brakes for automobiles. In the usual automobile brake the road wheel is provided with a drum within the interior of which is an expandible band usually contracted by a spring out of frictional contact with the corresponding face of the drum and caused to be expanded to frictional engagement therewith by an expanding element usually a cam operated by a lever which in turn is connected by means of a pull rod or cable with the brake operating lever of the vehicle.

The principal object of this invention is to provide an expanding mechanism including a cam having a spiral face by means of which a constant leverage is provided to cause expansion of the band and when released to pressure by the contracting spring readily returns to non-expanding position.

A further object of the invention resides in the provision of a pair of rotatable members connected with the adjacent ends of a split band one of which is of cam like form whereby on rotation thereof the band is expanded to frictional contact with the drum.

A further feature of the invention is in the provision of such members rotatable on an axis at a right angle to the axis of rotation of the drum, to the cam member of which is connected a pulley and cable passing outwardly from the interior of the drum to connection with the brake operating lever.

These and other objects and novel features of the invention are hereinafter more fully described and claimed, and the preferred form of construction of an internal brake expanding mechanism embodying my invention is shown in the accompanying drawings in which—

Fig. 3 is a plan view of the expander on an enlarged scale.

Fig. 4 is a section taken on line 4—4 of Fig. 3.

Fig. 8 is a similar view showing the cable connection and support therefor at the point in which it passes into the interior of the drum.

Fig. 9 is a detail in perspective showing an end of the band to which the expander is attached.

Fig. 10 is a perspective view of the bracket providing a support at one end for the cam or wheel shaft.

Fig. 11 is a detail in section showing the manner of attachment of the cable to the cam and operating pulley.

Figure 2:
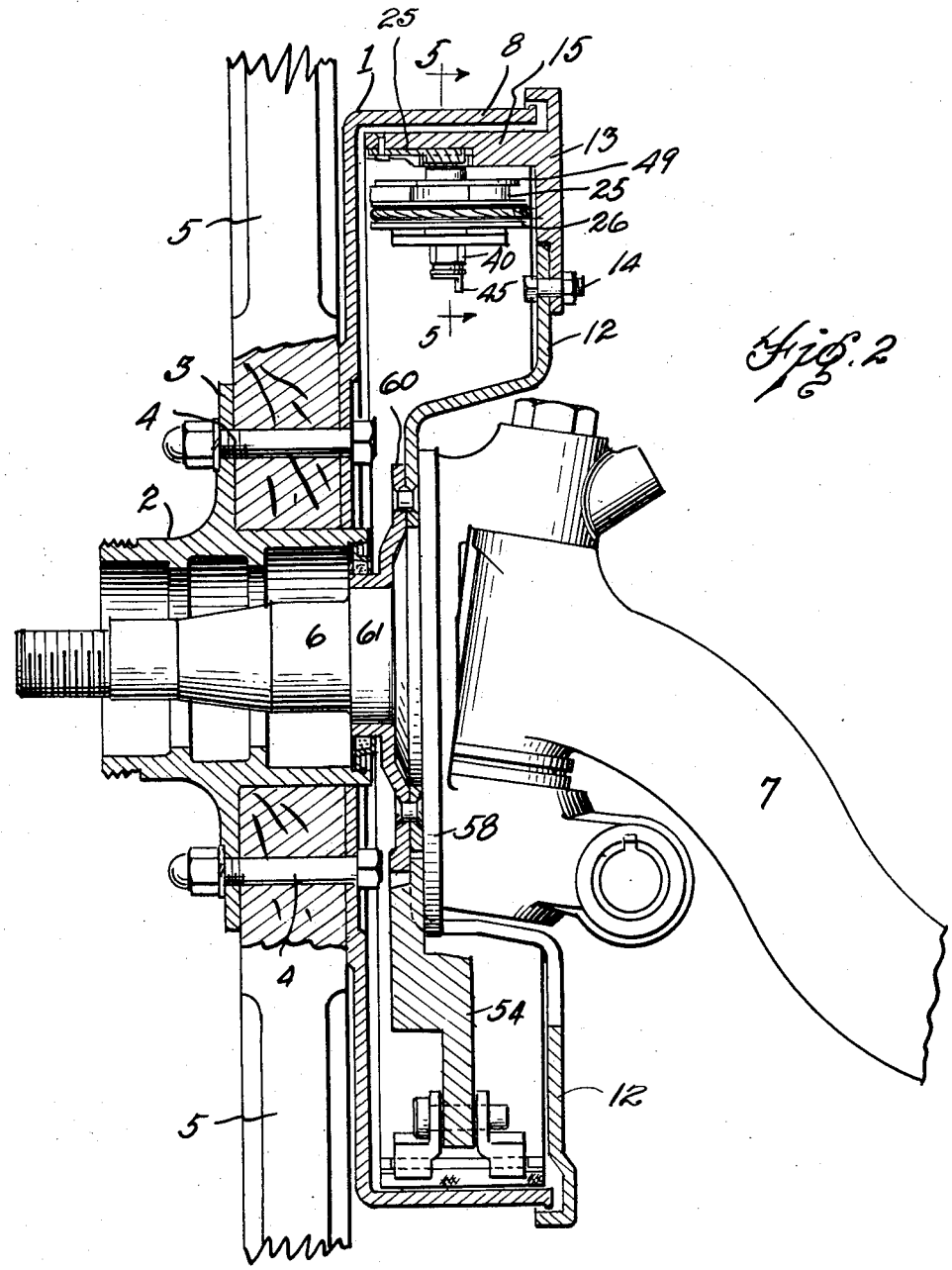
Fig. 2 is a section taken on line 2—2 of Fig. 1.

The drum 1 is fixedly attached to the automobile wheel, the hub of which is shown at 2 in Fig. 2. This hub has a flange 3 and bolts 4 are passed through apertures provided in the flange and through the butt end of the spokes 5 and the side wall of the drum 1, thus securing the parts together. This wheel is understood to be mounted on the wheel spindle 6 by interposed bearings (not here shown). The front wheel, as is illustrated in Fig. 2, has the spindle pivotally mounted on the end of the axle 7 all of which is the usual construction. The drum is also provided with the usual flange 8 and the brake band, here illustrated as being of two parts 9 and 10, lies within this drum. The outer face of the bands has the usual brake lining 11 which may be brought to frictional engagement with the drum.

While I have here shown the band as being formed of two parts it is to be understood that the construction of the band may be varied, it being immaterial to this invention as to whether it be formed of one or more parts as my improved expander may be utilized with any of the well known forms of expanding bands. The drum is provided with a cover plate indicated at 12 and this plate is formed with an aperture at its upper side in which the bracket 13 is mounted and secured to the cover plate by bolts 14. This bracket 13 has an inwardly extending portion or arm 15, the purpose of which is hereinafter described. This bracket 13 is also provided with a lug 16 having an aperture and counterbored and threaded at its outer end to receive the apertured and recessed nut 17 as shown in Figs. 3 and 8.

The cable 18, by means of which the expander is operated, extends through the aperture provided in the lug 16 and has a coiled spring 19 secured in the recess of the nut 17 at one end and at a distance therefrom is secured to the cable as at 20, the purpose of the spring being to prevent kinking or a sharp bend in the cable in the brake application and to take up slack in the cable.

Figure 5:
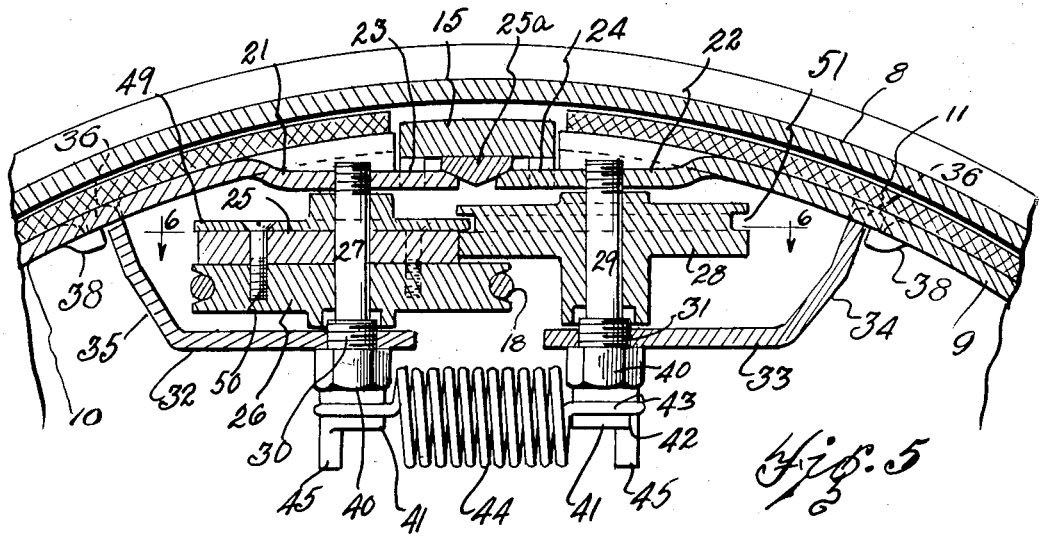
Fig. 5 is a section on an enlarged scale taken on line 5—5 of Fig. 2.

The band ends, as shown clearly in Fig. 5, have the ends punched inwardly as indicated at 21 and 22 providing tongues 23 and 24 which have beveled end portions engaging the correspondingly sloping faces of the member 25a pivotally secured to the arm 15 of the bracket 13.

The function of this member 25a is to insure that the band ends are held out of contact with the drum when the band is contracted as is hereinafter more fully described.

The expander is shown more clearly in Figs. 1 to 5 inclusive and consists of a cam member 25, an operating pulley 26 therefor on a shaft 27, and a guide wheel 28 on the shaft 29. These shafts 27 and 29 are threaded at their upper ends for threaded relation with a threaded aperture provided therefor in the respective portions 21 and 22 of the band ends and at their lower ends are provided with an enlarged threaded portion 30 and 31 respectively for threaded relation with a threaded aperture in the ends of the respective brackets 32 and 33. These brackets are, in the assembled relation shown in Fig. 5, formed with the horizontal portions which have the threaded aperture for the shafts 27 and 29 as above described and end portions extending upwardly at an angle indicated at 34 and 35.

The ends of these angular portions at the opposite edges are provided with the outwardly bent lugs 36 and 37 for each bracket which fit behind the corresponding lugs 38 and 39 struck up from the edge of the band ends as shown in Figs. 9 and 10. Thus, the guide wheel 28 and its shaft 29 and bracket are wholly supported by one end of the band and the cam wheel 25, the cable pulley 26 and shaft 27 and bracket therefor or wholly supported by the adjacent opposite end of the band. Each of the shafts 27 and 29 are formed with a hexagonal head 40 having a terminal cylindrical portion 41 formed with a circumferential groove 42 for the end 43 of the contracting spring 44. This spring is formed with the end eyes 43 to engage in the grooves 42 of each of the extensions 41 and tends to contract the band ends and thereby release the brake and in so doing the pivotal member 25 having the sloping faces for the tongues 23 and 24 of the band ends causes the same to withdraw from contact with the drum under the action of the spring 44.

For ease in assembly these brackets 32 and 33 are not fastened to the respective ends of the band but are merely slipped in place as above described and the shafts 27 and 29 assembled in position in the apertures of the bracket and band which holds the brackets 32 and 33 in parallelism with the portions 21 and 22 of the band ends and between which the cam and pulley and guide wheel are respectively positioned.

Figure 12:
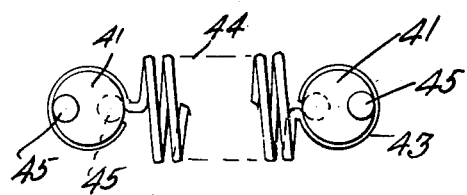
Fig. 12 is a plan view of the contracting spring illustrating the manner of assembly on the supports therefor.

Inasmuch as the spring 44 has considerable tension and would ordinarily be difficult to place in position, I have provided the portions 41 of the heads of the shafts 27 and 29 with a depending lug 45 in each case eccentric to the axis of the shaft and thus, with these lugs 45 turned 180 degrees from the position shown in full lines in Fig. 12 to the position shown in dotted lines, they are a considerably less distance apart. These end portions or eyes 43 of the spring may then be readily slipped thereover and the bolts turned to position the eccentric lugs 45. This places the spring under tension and then the eyes may be moved upwardly on the members 45 to engagement in the groove formed in the cylindrical portions 41 of the extensions of the shaft ends. This arrangement permits the spring to be assembled by the fingers and without use of tools except possibly to turn the shafts to their final position as is shown more particularly in Figs. 5 and 12.

The operation of the expander is as follows—

Figure 6:
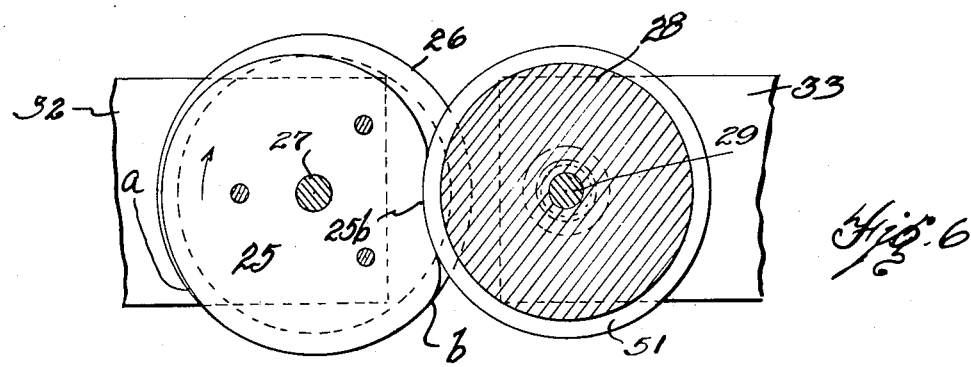
Fig. 6 is a section taken on line 6—6 of Fig. 5 showing the expander cam and wheel in position assumed when the brake is contracted.

It is to be noted from Figs. 5 and 6 for instance that the cam 25 has a spiral face and is further provided with a depression 25b at the low point of the cam in which the face of the wheel 28 lies when the band is in contracted position. This recess is in the form of an arc of the same radius as the face of the wheel 28 with which it engages and not only provides a seat for the wheel when the band is contracted but also upon turning the cam causes a quick lift to take up the slack of the band. This cam member 25 is secured by means of screws as shown to the cable pulley 26 therebelow.

The cable, as before stated, passes into the drum through the bracket 13 and extends around the peripheral groove of the pulley 26 and has a terminal end portion 46 which is passed into an aperture provided therefor in the pulley and upwardly into a conical split bushing 47 secured in an aperture in the cam wheel and cover plate therefor. This end 46 may be secured in the conical bushing by means of a solder 48 as shown in Fig. 11.

The split bushing 47 is formed of two half parts and the aperture in the cam member 25 is greater in diameter than the transverse aperture 60 in the pulley which is in registration therewith. Thus, the bushing when the parts are assembled as shown in Fig. 11, seats on the pulley enabling pressure to be applied to the cable. The construction also permits the parts to be readily assembled by pushing the cable through the aperture 60 and the aperture in the cam 25 and the bushing placed about the cable and inserted in the aperture therefor in the cam thus providing a secure fastening for the cable.

Upon pulling on the cable 18 the pulley 26 and cam 25 are turned in the direction of the arrow shown in Fig. 6 which causes the continually higher part of the cam member to roll on the wheel 28. This rotation spreads the ends of the bands and causes a frictional contact of the band with the drum and it is to be noted that at about the point $a$ to the point $b$ the periphery of the cam is on a radius from the axis of the shaft 27 and this determines the greatest possible expansion of the brake.

In practice the parts are so assembled and related that only about one-half to three-fourths of the rise of the cam is required to set the brake and the reason for this is that this spiral face (which is really a form of wedge) is relied upon to cause reverse rotation of the cam through pressure exerted between the wheel 28 and cam by the contracting spring upon release of the pressure on the cable.

Figure 7:
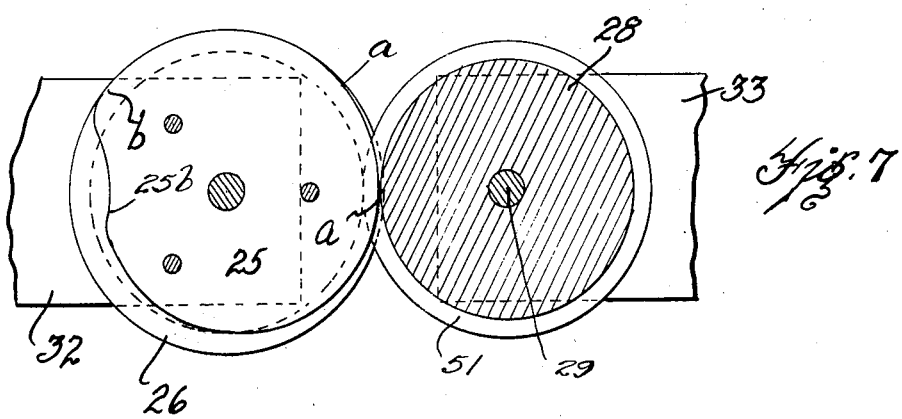
Fig. 7 is a similar view showing the cam and wheel in the position assumed when the brake is expanded.

It is also to be noted that the shafts 27 and 29 for the cam and wheel are at a right angle to the axis of rotation of the drum and thus I am enabled to provide a cam with a slower lift than previous types of cam expander which are turned on an axis parallel with the axis of rotation of the drum and without sacrificing anything in the speed of action of the parts. Upon release of pressure on the cable and due to the pressure of the spring 44, the cam 25 and wheel 28 rotate in the reverse direction until the parts assume the relationship shown in Fig. 6 with the wheel face engaging the arcuate portion 25b of the cam which forms a seat for the wheel from which it does not accidentally become displaced through the jar or road shock to which it is subjected and does not wear a flat spot on the wheel or cam at the point of contact. The expanded relationship of the cam and cam wheel is shown in Fig. 7 with approximately the highest point of the cam in contact with the wheel.

I provide a cover plate 49 for the cam which is secured thereto and to the pulley 26 by means of the screws 50 heretofore mentioned. This cover plate overlies the face of the cam as shown in Fig. 5 providing a flange that rides in the circumferential groove 51 formed in the wheel 28. This relationship of the edge of the cover plate 49 and groove 51 holds the wheel and cam in their necessary alignment and maintains the cam face in contact with the face of the wheel.

The band is here shown as being formed of the two parts 9 and 10 the mechanism for the expansion of which is hereinbefore described. The opposite ends of these bands have offset terminal portions 52 and 53 which engage a retainer element or lever indicated generally at 54. This retainer is pivotally supported at 55 in a socket 56 carried by the bracket 57 provided on the part 58 of the spindle indicated by dotted lines in Fig. 1. This bracket is therefore stationarily positioned relative to the spindle and permits the lever to turn on engagement of the band with the brake drum and band.

The upper end of the lever 54 is socketed at 59 in a depending end of the plate 60 to which the brake drum cover plate 12 is attached. This plate 60, as shown in Fig. 2, is rotatably mounted upon the portion 61 of the spindle provided therefor and the arrangement is such that rotative movement of the cover member 12 and plate 60 causes movement of the lever 54 in its pivotal mounting 55 and in this construction shown the purpose is to cause pressure to be applied to the end 52 for instance of the half band 9 in the same direction as it is applied to the end 21 of the half band 10 in the direction in which the drum rotates as indicated by the arrow in Fig. 1. This description of the brake band and its operation is merely to make clear the construction illustrated but such specific construction of a band and halves and the related parts 54, 55, 58 and 60 are not essential to this invention which is directed to the expanding element and method of applying power to the expander to cause an expansion or contraction of the band relative to the drum as it is to be understood that this expander is adapted for use with various types of construction of an internal expanding band and at the split point thereof.

Figure 1:
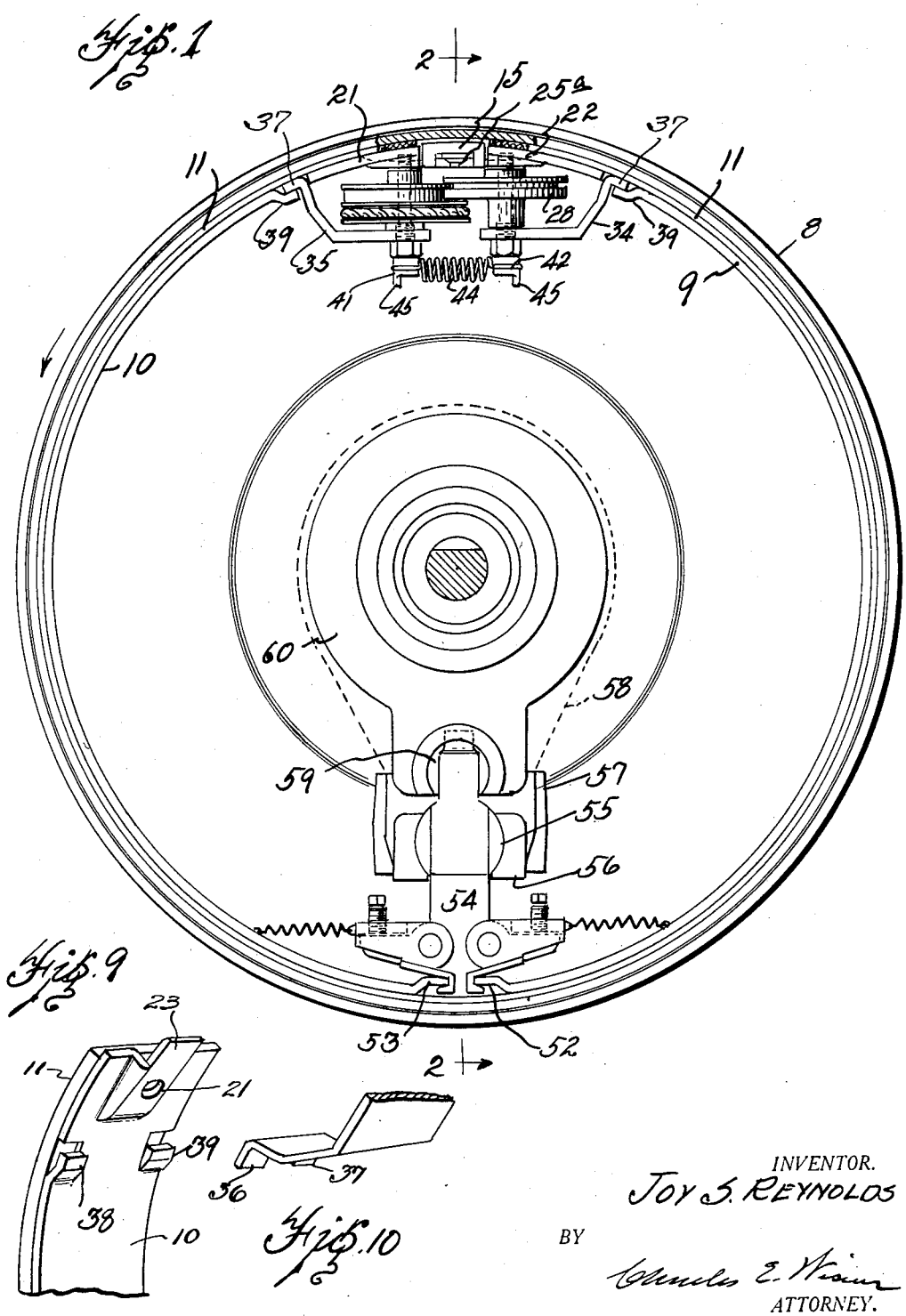
Fig. 1 is an elevation partly in section of the interior of a brake showing my improved expander as applied to the band.

The function of the pivoted member 25a is to permit the same to follow the band end which tends to travel with the drum upon being brought to frictional contact therewith—that is, rotation of the brake drum in the direction of the arrow shown in Fig. 1 upon application of the brake will cause the end 21 to tend to travel with the drum thus relieving the pressure on the corresponding side of the pivoted member 25a and, as the opposite end 22 of the band attempts to follow, this member 25a swings on its pivot and maintains its proper relationship between the beveled ends of the tongues and the respective ends of the band.

From the described construction and arrangement particularly of the expanding mechanism it will be evident that by a direct pull upon the cable 18 the pulley 26 and cam 25 are rotated in a direction to increase the distance between the centers of rotation of the cam 25 and guide wheel 28 and thus causes an expansion of the band at the split end or between separate portions thereof; that upon release of the cable the spring 44, by reason of the pressure between the wheel 28 and the cam face 29, causes a reverse rotation thereof until the wheel is seated in the arcuate portion 25b of the cam and also as the cam 25 and wheel 28 are rotatable on an axis at a right angle to the axis of rotation of the drum (which is the preferred arrangement), a cam and wheel of considerable diameter may be utilized which enables the cam to be formed with a true spiral face for the reasons heretofore given and resulting in ease of operation of the brake through application of a constant leverage in causing an expansion thereof.

One of the results of the use of a cam of spiral form is that a considerable travel of the cable is required to operate the expander to set the brake and with the higher leverage located at the band no resultant variation in leverage in the application of the brake is provided by reason of the motion of the body of the vehicle relative to the band. It therefore is not necessary to carry the cable in a conduit of the Bowden wire principle as has commonly been the case as any variations in the position of the cable cannot materially affect the operation of the expander.

It is further to be observed that the device is comparatively simple and inexpensive in construction, and that the various objects of the invention are attained by the construction described. It is to be understood, however, that the invention contemplates the use of a cam and a wheel so connected with the adjacent ends of the band as to cause expansion of the band by rotation of the cam in one direction and a contraction thereof by pressure exerted on the parts as by a spring, and that various departures from the specific details of the parts and their arrangement may be made without departing from the spirit of this invention as set forth in the appended claims.

Having thus fully described my invention, what I claim and desire to secure by Letters Patent of the United States is—

1. The combination with a brake drum and a split brake band therefor of the expanding type, of an expanding mechanism for the said band comprising a rotatable cam attached to one end of the band, a rotatable wheel attached to the adjacent opposite end of the band in face contact with the cam, the cam and wheel being mounted to turn on parallel axes at practically a right angle to the drum axis rotation of the cam in one direction causing an expansion of the band to frictional engagement with the drum, a cable and pulley therefor by means of which the cam may be rotated in a direction to cause an expansion of the band, and a spring causing pressure contact of the wheel and cam to cause reverse rotation of the cam upon release of the cable.

2. The combination with a brake drum and a brake band therefor of the expanding type, of an expanding mechanism for the said band comprising a rotatable cam member, a rotatable wheel in face engagement therewith, the cam and wheel being rotatable on parallel axes at a right angle to the axis of rotation of the drum, means for rotating the cam member in a direction to cause an increase in distance between the axes of rotation of the wheel and cam, and a spring causing pressure contact of the wheel and cam whereby a reverse rotation of the cam is caused upon release of the operating means and thereby contracting the band.

3. The combination with a brake drum and a brake band therefor having separable ends, of an expander for the said band consisting of a cam member rotatably supported by one end of the band, a wheel rotatably supported at the adjacent opposite end of the band and engaging the cam face said wheel and cam being turnable on parallel axes at an angle to the drum axis, means for rotating the cam in a direction to increase the distance between the centers of rotation of the cam and wheel, and a spring tending to decrease the distance between said centers of rotation.

4. The combination with a brake drum and brake band therefor of the split expanding type, of an expanding mechanism for the band comprising a cam, a shaft fixed at one end to one end of the band and on which the cam is rotatable, a bracket connected with the band and supporting the other end of the shaft, a second shaft secured in the same manner to the opposite end of the band, a wheel rotatably supported thereon lying in face engagement with the cam, and means for rotating the cam to spread the shaft centers.

5. The combination with a brake drum and brake band therefor having spindle ends, of an expanding mechanism for the band comprising a rotatable cam member mounted on one end of the band, a rotatable wheel in face contact therewith mounted on the adjacent end of the band, the cam and wheel being rotatable on parallel axes at a right angle to the axis of rotation of the drum, means for rotating the cam in a direction to increase the distance between the axes of rotation of the cam and wheel, and a spring causing a reverse rotation of the cam upon release of the operating means therefor.

6. The combination with a rotatable brake drum and a brake band therefor of the split expanding type providing oppositely disposed end portions, of an expanding mechanism for the band comprising a rotatable cam member supported at one end of the band, said cam having a face of spiral form, a rotatable wheel supported by the other end of the band lying in face engagement with the cam, said wheel and cam being turnable upon parallel axes lying at practically a right angle to the axis of the drum, means for causing rotation of the cam to increase the distance between the axis of rotation of the cam and wheel, and a spring exerting pressure between the cam and wheel causing reverse rotation of the cam upon release of the operating means.

7. The combination with a brake drum and a brake band therefor having separable ends, of an expanding device comprising a rotatable cam carried by one of the said ends having a spiral face, a rotatable wheel lying in face engagement with the cam and attached to the other of said ends, said cam face at its low point being formed with an arcuate recess having substantially the same radius as the wheel and providing a seat therefor when the cam is turned to permit contraction of the band whereby upon the beginning of rotation of the cam, a quick initial separation of the axes of the wheel and cam is provided, and a spring yieldably holding the cam and wheel faces in contact.

8. The combination with a brake drum, of a brake band therefor having separable ends, of an expanding device comprising a rotatable cam carried by one of the said ends having a face formed with an arcuate portion from one end of which the rise of the cam starts, a rotatable wheel in face engagement with the cam normally seating in the arcuate recess of the cam when the band is in contracted position, the cam and wheel being so mounted relative to the respective separable ends that rotation of the cam in one direction causes an expansion of the band to frictional engagement with the drum, means for rotating the cam, and a spring holding the face of the wheel in pressure engagement with the face of the cam and tending to rotate the cam in the reverse direction upon release of the operating means.

9. The combination with a rotatable brake drum and a brake band therefor having separable ends, of an expanding mechanism therefor comprising a rotatable cam member connected to one end of the band, a rotatable wheel in face engagement therewith connected with the other end of the band, said cam member being provided with a circular flange portion and the wheel being formed with a groove in which the periphery of the flange lies thereby maintaining the wheel and cam in face engagement, means for rotating the cam member to cause an increase in distance apart of the axes of rotation of the cam and wheel, and a spring exerting pressure between the cam and wheel tending to cause reverse rotation thereof.

10. The combination with a brake drum and a band therefor of the split expanding type, of a rotatable cam member attached to one end of the band and a rotatable wheel attached to the opposite adjacent end of the band, a shaft for the said cam, a shaft for the wheel, the axes of which are at a right angle to the axis of rotation of the drum, said shafts being attached at their upper ends to the respective ends of the band, a bracket for the lower ends of each of the shafts, the said shafts having a depending circumferentially grooved portion and a further depending pin like portion eccentric to the circular groove portion, one side of which is coextensive with the face of the circular grooved portion providing a construction that upon the turning of the shafts through an arc of 180 degrees the pin like portions are spaced the least distance apart, a spring having eyes insertable over the pin like portions when at their least distance apart, the rotation of the shafts in opposite directions increasing the distance between the pins thereby placing a tension upon the spring, said pin like portions providing guide means for placing the said eye portions of the springs in their respective grooves of the shafts.

11. The combination with a rotatable brake drum and a brake band therefor of the split expanding type providing oppositely disposed end portions, said end portions, said end portions having oppositely inclined beveled edges toward the outer face of the band, of an expanding mechanism for the band comprising a rotatable cam, a rotatable wheel in face engagement therewith, the cam and wheel being so supported relative to the band that rotation of the cam in one direction causes an expansion of the band, a spring tending to contract the band, and a pivotally supported spreader member having oppositely inclined faces positioned between the inclined faces of the band ends whereby upon contraction of the band the said ends are forced inwardly away from the drum by reason of contact with the spreader member.

12. The combination with a rotatable brake drum and a brake band therefor of the split expanding type, of an expanding mechanism for the band comprising a rotatable cam member, a rotatable wheel in face contact therewith, a shaft for each of the said cam and wheel members each supported at its upper end by the respective ends of the band, a bracket for the lower end of each shaft detachably connected with the brake band adjacent its opposite ends, a spring extending between the said shafts tending to decrease the distance therebetween, a pulley to which the cam is attached, and a cable for rotating the pulley and cam in a direction to increase the distance between the axes of the said shafts, said shafts being mounted in parallel relation on an axis at a right angle to the axis of rotation of the drum.

13. The combination with a rotatable brake drum and a brake band therefor of the split expanding type, a cover plate for the drum, an expanding mechanism for the band housed within the drum and comprising a rotatable cam member and a rotatable wheel in face engagement therewith and positioned with the axes of rotation in parallel relation and at a right angle to the axis of rotation of the drum, a pulley for the cam member, a cable for the pulley extending tangentially thereto through the cover portion for the drum, said cover portion including an apertured plate through which the cable extends, an expanding spring attached at its inner end to the apertured member and at its outer end to the cable, said parts being so arranged that, upon pulling of the cable, the pulley and cam are rotated causing an increase in the distance apart of the axes of rotation of the cam and wheel and upon release of pressure the spring takes up the slack of the cable, and a contracting spring exerting pressure between the wheel and the cam to cause reverse rotation thereof upon release of the cable and consequent contraction of the band.

14. In combination with a brake drum, an expandible band therefor, of an expanding mechanism including a rotatable cam, a pulley attached thereto and rotatable on the same axis, a flexible element for the pulley, said pulley having a radial aperture opening from the rim of the pulley on the one end, a transverse aperture adjacent the rim into which the first named aperture opens at its opposite end, said cam having a transverse aperture of greater diameter than the transverse aperture of the pulley and in registration therewith, a bushing for the said cam aperture formed of two half parts and providing a conical recess in the outer side of the cam and opening at the bottom to the transverse aperture of the pulley, said tension element having its inner end extending through the apertures of the pulleys into the conical recess of the bushing and provided with a conical end portion fitting the conical recess of the bushing, the whole providing a quick releasable attachment for the cable end.

JOY S. REYNOLDS.